(No Model.)
G. G. BUCKLAND.
VEHICLE SPRING.
No. 256,284. Patented Apr. 11, 1882.
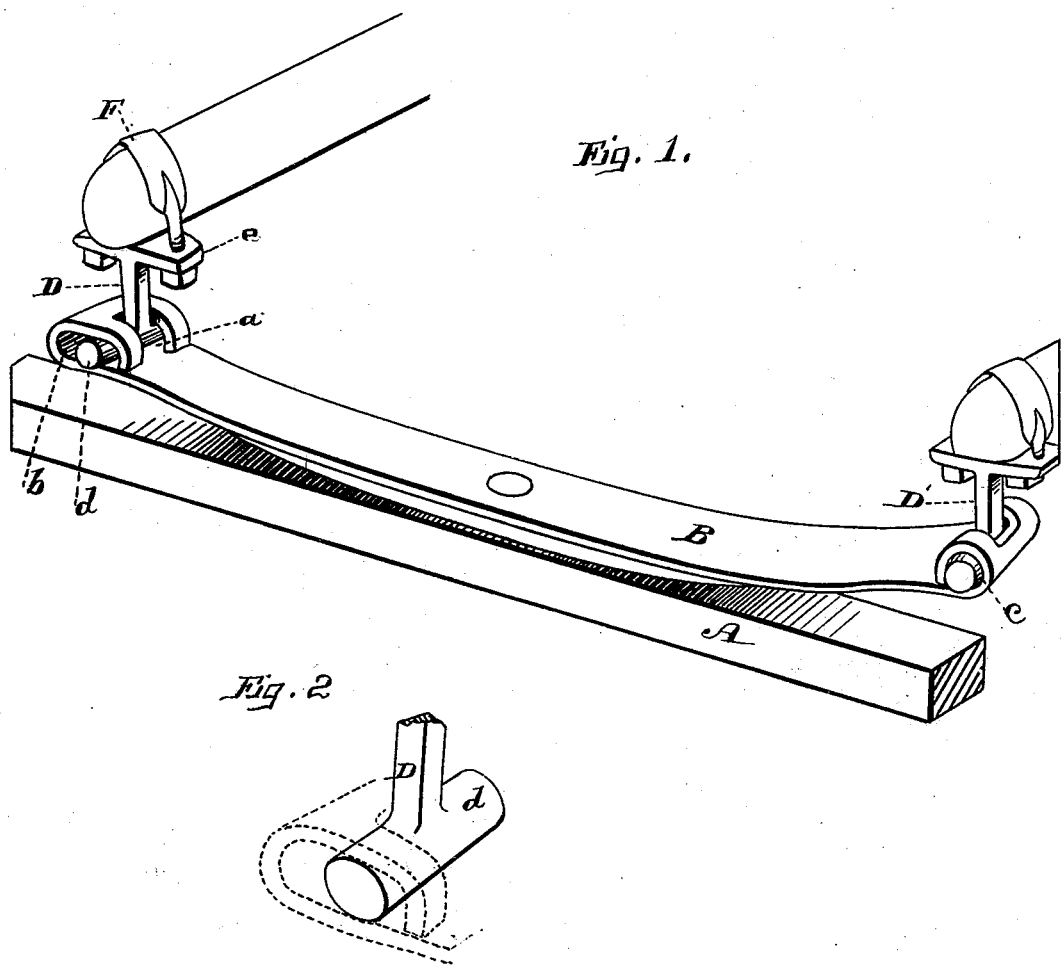
Witnesses
Geo. H. Strong.
Frank A. Brooks
Inventor
George G. Buckland
By Dewey & Co.
Attys

UNITED STATES PATENT OFFICE.

GEORGE G. BUCKLAND, OF TULARE, CALIFORNIA.

VEHICLE-SPRING.

SPECIFICATION forming part of Letters Patent No. 256,284, dated April 11, 1882.

Application filed January 23, 1882. (No model.)

*To all whom it may concern:*

Be it known that I, GEORGE G. BUCKLAND, of Tulare, county of Tulare, State of California, have invented a Vehicle-Spring and Shackle; and I hereby declare the following to be a full, clear, and exact description thereof.

My invention relates to a new and useful spring and shackle for vehicles; and it consists in forming one end of the spring into a proper journal or bearing, wherein the shackle which is bolted or secured to the body or frame may have a certain play to accommodate the rigid frame or body to the movement of the spring, as will hereinafter be more fully described, reference being made to the accompanying drawings.

Figure 1 is a perspective view. Fig. 2 is an enlarged detail.

It is obvious that by reason of the nature of a vehicle-spring the ends thereof, when a weight is brought upon the spring, move apart, and a straight line joining their ends is longer when the spring is borne down upon than when in a natural position. If the body of the vehicle or any portion of the rigid frame thereof—as, for example, the side bars—be secured to the spring firmly, as is usually done, there is no provision made for the operation of the spring, and the ends being held together by a rigid line they cannot yield to accomplish the spring motion.

The object of my invention is to provide for this difficulty.

Let A represent the rear axle of a vehicle, to which the end spring, B, is secured at its middle, as shown. This spring may be composed of any number of leaves, here shown as having two. The top leaf upon one end is slotted at $a$, and turned over upon itself, forming a socket, $b$, as shown. This socket is an elongated one, while at the other end of the spring a similar though circular one, $c$, is formed.

In the socket $b$ is loosely journaled the shackle D. This has a cross-base, $d$, preferably made somewhat elliptical in order to have a greater bearing-surface. It fits loosely in the socket $b$, so that the shackle may have a slight play, though it cannot turn over. The shank of the shackle extends upward through the slot $a$, and has a cross-head, $e$, upon which and to which the body of the vehicle is bolted or secured. If there are side bars, a clip, F, passing over the side bars and down through the cross-head $e$, which serves thus as a clip-yoke, may be used. Upon the other end of the spring a similar shackle, D', is placed, though in this case the shackle is made rigid in the socket $c$.

The reason of this construction is that the spring will only require a loose or hinge bearing at one end. By having this loose shackle D, provision is made for the movement of the spring. It is obvious that this could be applied to a side spring as well as an end one, as here shown. If necessary, both ends could be made to receive loose shackles; but I have found by experiment that one only need be thus fashioned.

Having thus described my invention, what I claim as new, and desire to secure by Letters Patent, is—

In a vehicle, the spring B, having its end slotted and formed into an elongated journal-socket, $b$, in combination with the shackle D, having a cross-base, $d$, working in the socket $b$, and having a slight play therein, said shackle having a cross-head, $e$, adapting it to be secured to the body or frame of the vehicle, substantially as and for the purpose herein described.

In witness whereof I hereunto set my hand.

GEORGE GARDNER BUCKLAND.

Witnesses:
C. D. COLE,
J. H. BLOOD.